(12) United States Patent
Barkdoll

(10) Patent No.: US 8,945,272 B1
(45) Date of Patent: Feb. 3, 2015

(54) LOW TEMPERATURE PRODUCTION OF STEEL/CARBON PRODUCT

(71) Applicant: Forest Vue Research, LLC, Knoxville, TN (US)

(72) Inventor: Michael P. Barkdoll, Knoxville, TN (US)

(73) Assignee: Forest Vue Research LLC, Knoxville, TN (US)

( * ) Notice: Subject to any disclaimer, the term of this patent is extended or adjusted under 35 U.S.C. 154(b) by 0 days.

(21) Appl. No.: 14/190,160

(22) Filed: Feb. 26, 2014

(51) Int. Cl.
  *C21B 15/00* (2006.01)
  *C22C 38/00* (2006.01)

(52) U.S. Cl.
  CPC ................. *C22C 38/00* (2013.01); *C21B 15/00* (2013.01)
  USPC .............................................. 75/316; 75/317

(58) Field of Classification Search
  CPC ................................................ C01B 13/00462
  USPC ....................................................... 75/316, 317
  See application file for complete search history.

(56) References Cited

U.S. PATENT DOCUMENTS

| | | | | |
|---|---|---|---|---|
| 4,395,285 A | * | 7/1983 | Merkert | 75/306 |
| 4,419,186 A | * | 12/1983 | Wienert | 201/6 |
| 4,728,358 A | * | 3/1988 | Hoffman et al. | 75/317 |
| 2012/0204678 A1 | * | 8/2012 | Sato et al. | 75/330 |

* cited by examiner

*Primary Examiner* — George Wyszomierski
*Assistant Examiner* — Tina M McGuthry Banks
(74) *Attorney, Agent, or Firm* — Luedeka Neely Group, PC

(57) ABSTRACT

In view of the foregoing embodiments of the disclosure provide a high value steel/carbon product from a low value iron-containing waste material and process for producing the steel/carbon product. The high value steel/carbon product is derived from a mixture of metallurgical coal and an oxidized iron waste material under a reducing atmosphere. The steel/carbon product has a porosity of greater than about 60% and a density of greater than about 900 kg/m3 and the steel component of the steel/carbon product has a percent of metalization of greater than about 85 wt. %.

16 Claims, No Drawings

LOW TEMPERATURE PRODUCTION OF STEEL/CARBON PRODUCT

TECHNICAL FIELD

The disclosure is directed to the production of a high value product namely, a steel/carbon product using a low value steel mill waste, and to a process for producing the steel/carbon product in a coke oven.

BACKGROUND AND SUMMARY

Metallurgical coke is used to make steel. Production facilities for making coke include both non-recovery coke ovens and byproduct coke ovens as the two major types of coke ovens. There exists a great need for an alternative use of coke ovens during downturns in the highly cyclical steel industry. Currently in North America approximately 55% of the crude steel produced is via an electric arc furnace (EAF) route, and 45% is produced via the blast furnace (BF) route. During downturns in steel demand the EAF operators can simply turn off the furnaces and wait for demand to recover. The EAF's produce crude steel by melting scrap metal and refining the molten metal in downstream ladle furnace. Historically the EAF's major markets have been construction materials such as reinforcing bars, and steel columns and beams. Sheet steel is also supplied to the "white goods" manufacturers, such as washers, dryers and refrigerators. A smaller percentage of the market for EAF operators is the higher value sheet steel (coils) for auto and truck bodies.

Blast furnace operators who produce crude steel utilizing iron ore and coke have a much more difficult time in throttling production during periods of low steel demand. This is because BF's are very large (i.e., BF's use 7.6 to 15 meters in diameter by 30.5 meters or more tall) ultra-high temperature counter current production reactor vessels which cannot be easily stopped or re-started. A typical BF campaign (continuous production) typically lasts 5-15 years. BF's can decrease crude steel production by slowing down the BF's and in the extreme case shutting them down completely until steel demand recovers.

Approximately 30% of the coke produced in North America is produced in what are called non-recovery, or heat recovery or horizontal ovens, while the remaining 70% is produced in what are called by-product or slot or vertical coke ovens. Unlike EAF's or BF's, once heated up coke ovens cannot be shut down or allowed to go cold.

Another ongoing need in the steel industry is the disposal of a typical steel mill waste known as mill scale. Mill scale is produced within the rolling mill operations of a steel mill and is a mixture of iron and iron oxides that is typically contaminated with oils and lubricants used in the rolling process. Typically steel billets or slabs are reheated to about 1100° C. (2012° F.) in a reheat furnace. The hot steel is then processed in the rolling mill and shaped into the desired end product mix such as rebar, angles, I-beams and sheet steel. Given that the steel is heated to a high temperature and is exposed to oxidizing agents such as air and water in the rolling mill, the surface of the steel is oxidized and forms flakes (also known as scale) which is flaked off during the rolling operations. It is known that from 1-5 weight % of the crude steel produced actually winds up as mill scale. More typically the range is 2-3 weight %. Given that North American steel production is typically about 82 million metric tons per year, this equates to an annual mill scale generation rate of 1.6 to 2.4 million metric tons per year.

In view of the foregoing embodiments of the disclosure provide a high value steel/carbon product from a low value iron-containing waste material and process for producing the steel/carbon product. The high value steel/carbon product is derived from a mixture of metallurgical coal and an oxidized iron waste material under a reducing atmosphere. The steel/carbon product has a porosity of greater than about 60% and a density of greater than about 900 kg/m$^3$ and the steel component of the steel/carbon product has a percentage of metalization of greater than about 85 wt. %. By contrast, metallurgical coke has a porosity of about 50% or less.

In another embodiment, the disclosure provides a process for the simultaneous production of coke and a steel/carbon product. The process includes mixing metallurgical coal with an oxidized iron waste material in a weight ratio of from greater than 1:1 to about 5:1 to provide a coal/oxidized iron mixture. The coal/oxidized iron mixture is size reduced so that from about 80 to about 95 wt. % is less than about 5 millimeters. The reduced size mixture is fed to a coke oven. The mixture is heated in the coke oven to a temperature of less than about 1250° C. for a period of time sufficient to convert the coal to coke and to reduce iron oxides in the oxidized iron waste material to iron, whereby the coke and iron form a steel/carbon product. The steel/carbon product is then quenched.

An advantage of the embodiments of the disclosure is that it provides a high value raw material source for making iron from a waste material that has little value. Another important advantage of the embodiments of the disclosure is that production of the steel/carbon product enables certain coke ovens to continue to operate even during a downturn in demand for steel by producing an alternative product in otherwise idle coke ovens.

DETAILED DESCRIPTION OF EXEMPLARY EMBODIMENTS

As used herein, the term "porosity" is a percentage of cell space of the product that is determined according to ASTM D 167-12A from the apparent specific gravity of a moisture free product and the true specific gravity of a moisture free product passing a 75 μm size, as follows:

$$\text{Porosity} = 100 - 100(\text{apparent sp. gr.}/\text{true sp. gr.}).$$

As noted above, mill scale is a low value waste product. However, mill scale is also an excellent source of iron units. The term "iron units" refers to any iron rich material such as iron ore. Unlike iron ore, mill scale does not contain any appreciable amounts of non-iron contaminants also known as gangue. Typically gangue are minerals that occur with iron ore such as silica, alumina, calcium etc. These materials form slag when iron is reduced in a BF, and slag adds to the operating cost of a blast furnace. Also mill scale does not contain any of the contaminants found in scrap metal such as silica, alumina, calcium that are caused by contamination. More importantly mill scale does not contain any potential hazardous contaminants such as mercury, arsenic, lead and cadmium which are typically found in scrap metal and are released as toxic metal emission when scrap is melted in an EAF. It is instructive to note that mill scale is actually derived from high quality steel wherein all of the contaminants have already been removed in the steel making processes. Contaminants must be removed from steel so that the steel products can meet stringent steel grade specifications. Accordingly, mill scale is high quality steel that has been oxidized.

However, despite its high iron content, mill scale is considered one of the most difficult of iron rich materials to reduce to metallic iron. Mill scale has a very high proportion of FeO which is not easily reduced to iron metal. The reduction of the iron product is quantified in terms of the metalization. Metalization is determined analytically by measuring the weight ratio of metallic iron (i.e., Fe) divided by the total amount of iron, including iron oxides, expressed as a percentage. The minimum weight percentage metalization considered suitable for commercial applications is approximately 85 wt. %. Mill scale may have a metalization percent ranging from about 1.5 up to about 10 weight percent.

A typical analysis of unreduced mill scale is presented in Table 1.

TABLE 1

|  | Total Fe wt. % | Metallic Fe wt. % | Fe++ wt. % | C wt. % | S wt. % | Wt. % Metalization |
|---|---|---|---|---|---|---|
| Mill scale | 71.5 | 1.2 | 70.4 | 0.76 | 0.041 | 1.7 |

As shown in Table 1, mill scale is essentially oxidized iron (Fe++) and hence has relatively low weight percent metalization. By way of example iron rust has a very low weight percent metalization while steel has a very high weight percent metalization. Scrap steel has a slightly lower weight percent metalization due to the presence of rust. Iron ore has an almost zero weight percent metalization whereas commercially viable direct reduced iron (DRI) pellets have a percent metalization of 85 wt. % or greater. DRI pellets are a form of preprocessed iron ore and are used as a substitute for scrap metal in EAF's. In economic terms the higher the weight percentage of metalization the more valuable and usable a product would be in ladle furnaces, basic oxygen furnaces, EAF's, BF's and cast iron production which will be discussed in more detail below. Iron and steel are graded or categorized by the alloy contents, most notably the carbon content. In descending order of carbon content, the grades are pig iron (3.5 wt. % to 4.5 wt. %), cast iron (2.0 wt. % to 3.5 wt. %), ultra-high carbon steel (1.0 wt. % to 2.0 wt. %), high carbon steel (0.6 wt. % to 1.0 wt. %), medium carbon steel (0.3 wt. % to 0.6 wt. %), low carbon steel (0.05 wt. % to 0.3 wt. %), and ultra-low carbon steel (less than 0.05 wt. %).

Researchers have noted that while mill scale has a very high iron content and low contaminant level, it is very hard to reduce because it has no porosity. Other iron bearing materials that may be used according to embodiments of the disclosure may include thermally treated electric arc furnace dust and iron ore fines. Iron ore fines are an iron bearing ore material including, but not limited to, $Fe_2O_3$ (hematite) or $Fe_3O_4$ (magnetite) that is generally less than 1 mm (0.37 in) in size and that may contain non-iron elements (gangue) of silica, alumina, and/or other elements or compounds depending on the iron ore deposit characteristics.

Mill scale has two interesting attributes. First it is a very low value waste product typically valued at less than $25 per metric ton. The reason for the low value is that there is almost no market for it. A low percentage of the North American mill scale is supplied to cement plants. Mill scale can be wet, oily and is relatively fine powdery flaky material which makes material handling difficult. It is also a highly oxidized material that has very few uses in North America. For these reasons there are huge stock piles of mill scale in North America that must be disposed of.

Despite mill scale being an excellent source of iron units, the extremely low porosity of mill scale inhibits the reduction of this waste material to iron having a percentage of metalization of 85 wt. % or greater. Considering the potential low utilization of coke ovens during downturns in the economy for steel production, a process for using coke oven capacity while simultaneously disposing of a metal waste stream was devised. According to an embodiment of the disclosure, mill scale is mixed with metallurgical coal to produce a mill scale/coal mixture that is reduced in size and fed to a coke oven for the production of a steel/carbon product. A by-product coke oven was selected as a suitable oven for the production of the steel/coke product due to its relatively lower operating temperature.

By-product coke ovens are narrow, long tall slots or chambers with typical dimensions of approximately 0.45 meters wide by 12 meters long with heights ranging from 3.5 to 6 meters. The side walls of each coking chamber contain firing flues where coke oven gas is combusted to provide the necessary heat and temperatures to drive the coke making process. Metallurgical coal is typically dumped (charged) into the slot oven chambers through 3-4 charge holes located on top of each chamber. Once coal has been charged to the oven, the coal begins to heat up from the outside via thermal heat transfer.

Typically, a coke oven battery, which refers to multiple ovens constructed side by side, will operate continuously for 40+ years. The reason that by-product coke ovens cannot be shut down or allowed to go cold is that the high purity silica bricks used to construct the ovens cannot be allowed to cool below about 580° C. (1076° F.). If the ovens go below this temperature a crystalline reaction takes place that causes the silica bricks to lose a substantial portion of their high temperature strength. Additionally coke ovens cannot be allowed to cool because they are constructed with intricate brick work and heating flue passages in the side walls which are specially designed to allow for thermal expansion during heat up to approximately 1100° C. (2012° F.) and allowances are made for thermal expansion of the oven walls and flues. If the ovens are allowed to cool, thermal contraction occurs and the walls and flues develop cracks. Wall cracks will lead to coke oven gas short circuiting and the oven will become inoperable.

In extreme downturns in steel demand and hence coke demand, coke ovens may be taken off line which is referred to as "hot idle". Hot idle operations mean that coal is not charged into the ovens and no coke is produced. Simultaneously no coke oven gas is produced to fire the ovens so natural gas must be purchased to keep the ovens hot. Accordingly, the cost per month to maintain a 50 oven battery of by-product coke at above 580° C. may be extremely high. As would be obvious this is an very untenable situation as no revenues are being generated from coke sales and high expenses are incurred to fire the ovens on hot idle. The alternative to going to hot idle is to continue to produce coke and stock pile it. This also places an extreme financial burden on the coke plant operators because operating expenses are still being incurred, and no revenues are being generated. Approximately 80+% of the operating cost for a by-product coke plant is the purchase of expensive metallurgical coal. Accordingly, there is often excess capacity in a by-product coke oven to make a steel/carbon product as described herein during depressed market conditions.

As noted above one of the two raw materials for the BF steel production is metallurgical coke usually referred to as coke. Coke is produced in coke ovens where metallurgical coal is heated in the absence of air, sometimes referred to as destructive distillation. As the coal heats a series of physical and chemical reactions take place as described below. When heated in the absence of air, metallurgical coal is transformed into metallurgical coke by the following physical and chemical reactions.

A) From 30-100° C. (86-212° F.) moisture is driven off.
B) From 100-300° C. (212-572° F.) inherent coal gases also called volatile matter such as CO, $H_2$, and $CH_4$ are driven off.
C) From 300-600° C. (572-1112° F.) tarry material sometimes called bitumen is driven out of the coal and forms a liquidous mass also referred to as the plastic layer.
D) From 600-1000° C. (1112-1832° F.) the tarry material dehydrogenates and forms a solid porous high carbon material which is metallurgical coke.

Physically the coal to coke transformation is from a solid coal mass to a liquidous tarry mass and which is then re-solidified to a solid coke mass. In one embodiment, a mixture of metallurgical coal and mill scale for making the steel/carbon product may be prepared by a simplified grinding and mixing process. In typical coke plant operations, raw metallurgical coal is processed through a hammer mill prior to charging it into the by-product coke ovens. Lump coal generally has a largest dimension in the range of approximately 12 mm to 50 mm (0.5 in to 2.0 in), with small lump coal tending to fall in the lower half of that range. The typical size consist for charge coal is 85-90 less than 3 millimeters.

Since grinding the mill scale is also advantageous to increasing the surface area for reducing mill scale to iron, a mixture of metallurgical coal and mill scale may be made and processed through the hammer mill used to reduce the size of the coal, thereby achieving appropriate coal size consist and simultaneously producing prepared mill scale. The foregoing process may also ensure complete mixing of the coal and mill scale for steel/carbon production.

When using a byproduct or slot coke oven to make the steel/carbon product described herein, the mixture that has been reduced ground or reduced in size may be dumped into the oven as a free flowing mixture. In another embodiment, the pre-ground mixture may be compressed or stamped into a vertical slab for charging to the oven as unitary slab of coal and mill scale. The entire oven may be charged with the coal/mill scale mixture or only a portion of the oven may be charged with the mixture the remainder of the oven being charged with metallurgical coal. In the case where the oven is only partially charged with the coal/mill scale mixture, the coke oven may produce both coke and the steel/carbon product.

In order to test the efficacy of the disclosed embodiments, box tests were conducted in full scale industrial production by-product coke ovens. The following examples are provided for illustrative purposes and are not intended to limit the disclosed embodiments as set forth herein.

EXAMPLE

Special high alloy metal boxes were filled with varying mixtures of metallurgical coal and prepared mill scale. Mill scale preparation consisted of grinding raw mill scale to a size consisting of 100 wt. % less than 0.8 mm. Previous pilot plant tests had shown that prepared mill scale reduced more completely and more easily than raw mill scale. It is believed that mill scale will reduce more rapidly by exposures to hot reducing gases such as CO, $H_2$, and $CH_4$ as the specific area of the mill scale is increased. Since mill scale is a flaky material, size reduction may be easily accomplished in a rod mill, ball mill, or hammer mill.

Two substantially different mixtures of coal and mill scale were made and loaded into the metal test boxes. Test number 1 was a mixture of 50 wt. % metallurgical coal and 50 wt. % prepared mill scale, while test number two was a mixture of 75 wt. % metallurgical coal and 25 wt. % prepared mill scale. Once the metal test boxes were loaded, they were dropped into a by-product coke oven along with a normal metallurgical coal charge. The ovens were operated in a typical coke production procedure with flue temperatures of 1200°-1300° C. (2192-2372° F.) and a coking cycle time of approximately 20 hours.

When the end of the coking cycle was reached, the coke and metal test boxes were pushed out into a hot car which transported the coke and boxes to the quench station where the incandescent coke and metal test boxes were deluged with water, also referred to as quenching. After quenching the cooled coke and test boxes were dumped out onto the coke wharf and the metal test boxes were recovered manually. The recovered samples from the metal test boxes were sent to a specialty laboratory for analysis. The results are shown in Table 2.

TABLE 2

| | | | | Test Box Results | | | | |
|---|---|---|---|---|---|---|---|---|
| Sample | Total Fe wt. % | $Fe_2O_3$ wt. % | FeO wt. % | Fe wt. % | Carbon wt. % | Sulfur wt. % | Phosphorus wt. % | Wt. % of Metalization |
| 50/50 mix | 40.28 | 10.2 | 19.7 | 17.9 | 45.2 | 0.5 | <0.02 | 44 |
| 25/75 mix | 22.1 | 4.14 | 1.54 | 18.0 | 68.2 | 0.9 | <0.02 | 82 |

Without desiring to be bound by theoretical considerations, it is believed that the following chemical and physical reactions occurred in the metal test boxes in the by-product oven. The metallurgical coal in the mill scale/coal mixtures was transformed into a coke like mass as described above. Meanwhile the prepared mill scale was converted from iron oxides into a high purity steel by the following chemical and physical reactions.
A) From 30-100° C. (86-212 F) moisture is driven off from the mixture.
B) From 100-300° C. (212-575° F.) no physical or chemical reactions occur other than heating.
C) From 300-600° C. (572-1112° F.) no chemical reactions occur, however physically the prepared mill scale became occluded into the tarry mass described above.
D) From 600-1000° C. (1112-1832° F.) the mill scale was intimately exposed to reducing gases from the coal volatile matter, primarily $H_2$, but also CO and $CH_4$.

At mill scale temperatures above approximately 800° C. (1472° F.) the CO and $H_2$ stripped oxygen off the iron oxides (i.e., reduction reaction took place) and the mill scale was converted from iron oxides to nearly pure steel, and partially or mostly encapsulated within the metallurgical coke. The actual product included small particles of steel encapsulated in coke to form a steel/coke agglomeration hereinafter referred to as a "steel/carbon product." Encapsulation of the steel in the coke reduces the amount of re-oxidation of the steel due to contact with moisture and air over time.

To those skilled in the art of iron reduction it is well known that at high temperatures (greater than 800° C. (1472° F.) hydrogen is the ultimate reducing gas because of the small size of the $H_2$ molecule, and its ability to penetrate reducible iron particles. It has been shown that the FeO which is the major oxide within mill scale is very difficult to reduce because mill scale has very few pores compared to iron ore which is quite porous.

With reference again to the metal test box test results shown in Table 2, it would appear, from a first glance, that the 50/50 mixture was not substantially reduced as evidenced by the moderate percentage of metalization of this mixture. Meanwhile the 25/75 mixture showed a substantially higher weight percentage of metalization. Calculations and pilot plant tests have shown there is sufficient reducing gas present and reduction temperatures greater than 800° C. (1472° F.) are achieved in a by-product coke oven so that nearly complete reduction can occur. Upon visual inspection of the metal test box samples the following observations were made.

A) The 50/50 mixture produced a somewhat crumbly product that could be broken by hand. Also it was noted that there were visual signs of significant re-oxidation that occurred during the quenching operation. The red color of rust (re-oxidized iron) was noticeable in the quenched product.

B) The 25/75 mixture produced a significantly different product. The product was hard, porous, could not be easily broken, and was quite dense. Subsequent density measurements showed that the 25/75 mixture product had an approximate density of 1121 $kg/m^3$ compared to metallurgical coke which has a typical density of approximately 801 $kg/m^3$.

C) The 25/75 mixture product had minor discoloration meaning re-oxidation occurred but not nearly as much as the 50/50 mixture.

The observations noted above as well as the metalization results in Table 2 lead to the theory that in the 25/75 mix, substantially all of the reduced iron was encapsulated within the coke matrix and hence was protected from re-oxidation during the quenching process, and subsequent storage. It is worthwhile to note that both samples were stored approximately 30 days prior to analysis. Given that quenched coke normally retains 6-8 wt. % moisture, this would mean that any non-encapsulated reduced iron was in close proximity to surface moisture. It is well known that surface moisture can contribute to substantial re-oxidation, (i.e., rusting).

A practical solution to protecting the non-encapsulated reduced iron from re-oxidation during storage may be to treat the quenched wet steel/carbon product with a low cost rust inhibitor such as coke oven light oil, or diesel fuel.

In summary, the foregoing runs in Table 2 clearly demonstrate that mixture ratios of mill scale to coal of less than 50/50 are preferred and a mixture ratio of 25 wt. % mill scale and 75 wt. % metallurgical coal produced a product with outstanding physical and chemical attributes such as a solid, hard non-friable cohesive product with a high percentage of metalization that was porous and had a high density.

The steel/carbon product produced by the foregoing process had both excellent physical properties as well as chemical properties as described above. The carbon (coke) portion of the product was a high carbon, low ash material with low sulfur and phosphorous content. The steel portion of the product was a highly metalized low carbon steel with no contaminants and was equivalent to very high quality scrap metal which typically sells for more than $400/metric ton.

The market potential for the steel/carbon product made according to the disclosure are numerous and varied within the steel and foundry industries. Examples include, but are not limited to, use of the steel/carbon product as a carbon raiser in the foundry industry. Typically foundries buy low carbon steel scrap and melt it in either a cupola or electric furnace. Prior to producing cast iron, carbon must be added to raise the carbon content from approximately 0.5 wt. % to 3-4 wt. %. The steel/carbon product would be a moderate cost carbon raising material and would also bring along high quality steel. In addition, because of the porosity of the steel/carbon product, the product may dissolve more quickly in molten iron, and due to its high density the product may not float on top of the molten iron. Accordingly, the steel/carbon product may be used to replace high cost anthracite coal normally used for carbon raising. The steel portion in the product would partially off-set the cost of high quality scrap iron required by cast iron foundries.

There are two potential uses for the steel/carbon product within the EAF production of crude steel. The first is as a carbon source for foamy slag formation. Foamy slag is used to float on top of the molten metal bath in an EAF and the foamy slag acts as an insulator. The insulation provided by the foam slag decreases radiant heat transfer from the top of the molten metal bath within an EAF. Insulating the molten metal bath provides protection to the refractory lining and shields the electrodes from accelerated wear. Foamy slag also reduces heat loss from the molten metal bath which reduces electric power consumption required to melt the scrap.

The second use within the EAF route of steel making is as a carbon raiser in the ladle as the molten metal is poured from the EAF into the transport ladle. Carbon added thusly is called ladle carbon and is used to increase the carbon content of the molten metal which raises the melting temperature. Raising the melting temperature ensures that the molten metal does not "freeze" prematurely in downstream operations. Coincident with raising carbon levels, the steel portion of the steel/carbon product provides additional steel production and due to its high purity helps to dilute contaminants normally found in freshly poured molten metal.

Another use of the steel/carbon product made according to the disclosure is as a partial coke substitute in the blast furnace route of steel making. The carbon portion of the product serves the same three functions as coke namely, providing support and maintaining burden porosity, a fuel source for the heat required, and a source of the reducing gas CO. In concert with this, the steel portion of the product melts, and does not require reduction gases which decreases the amount of coke required for steel making which is the major cost element for blast furnaces. Accordingly, the attributes of the steel/carbon product may lead to less slag, higher quality crude steel, lower coke rate, and higher furnace productivity.

In summary, embodiments of the disclosure solve two major problems, namely providing an alternative process for under-utilized by-product coke plants, and conversion a low cost readily available steel mill waste into a high value feed stock for both the steel industry and the foundry industry.

The terms defined in this application are to be interpreted without regard to meanings attributed to these terms in prior related applications and without restriction of the meanings attributed to these terms in future related applications.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention.

The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A steel/carbon product made by mixing metallurgical coal with an oxidized iron waste material to provide a mixture of coal and waste material; size reducing the mixture of coal and waste material to provide a mixture wherein 80 to 95 wt. % is less than about 5 millimeters; and heating the mixture of coal and waste material to a temperature less than about 1250° C. under a reducing atmosphere for a period of time sufficient to provide the steel/carbon product, wherein the steel/carbon product consists essentially of steel substantially encapsulated in metallurgical coke and has a porosity of greater than about 60% and a density of greater than about 900 kg/m$^3$ and the steel component of the steel/carbon product has a percent of metalization of greater than about 85 wt. %.

2. The steel/carbon product of claim 1, wherein the oxidized iron waste material comprises mill scale.

3. The steel/carbon product of claim 1, wherein the reducing atmosphere comprises a by-product coke oven.

4. The steel/carbon product of claim 1, wherein the mixture of metallurgical coke and an oxidized iron waste material comprises a weight ratio of metallurgical coal to oxidized iron waste material ranging from greater than about 1:1 to about 5:1.

5. The steel/carbon product of claim 1, wherein the steel/carbon product comprises from about 15 to about 45 percent by weight steel and from about 55 to about 85 percent by weight carbon.

6. A steel/carbon product derived from a mixture of metallurgical coal and an oxidized iron waste material under a reducing atmosphere, wherein the steel/carbon product is substantially encapsulated by coke and has a porosity of greater than about 60% and a density of greater than about 900 kg/m$^3$ and the steel component of the steel/carbon product has a percent of metalization of greater than about 85 wt. %.

7. The steel/carbon product of claim 6, wherein the steel/carbon product comprises from about 15 to about 45 percent by weight steel and from about 55 to about 85 percent by weight carbon.

8. A process for the production of a steel/carbon product, comprising:
    mixing metallurgical coal with an oxidized iron waste material in a weight ratio of from greater than 1:1 to about 5:1 to provide a coal/oxidized iron mixture;
    reducing the size of the coal/oxidized iron mixture so that from about 80 to about 95 wt. % is less than about 5 millimeters;
    feeding the reduced size mixture to a coke oven;
    heating the mixture in the coke oven to a temperature of less than about 1250° C. for a period of time sufficient to convert the coal to coke and to reduce iron oxides in the oxidized iron waste material to iron, whereby the coke and iron form a steel/carbon product consisting essentially of steel substantially encapsulated in metallurgical coke; and
    quenching the steel/carbon product.

9. The process of claim 8, wherein the coke oven is a by-product coke oven.

10. The process of claim 8, wherein the coal is mixed with the oxidized iron waste material in a weight ratio ranging from about 2:1 to about 4:1.

11. The process of claim 8, wherein the oxidized iron waste material comprises mill scale.

12. The process of claim 8, wherein the coal/oxidized iron mixture is reduced to a size of from about 80 to about 95 wt. % is less than about 3 millimeters.

13. The process of claim 8, wherein the oxidized iron waste material has a percent of metalization of from about 1.5 to about 10 weight percent.

14. The process of claim 8, wherein the mixture is heating in the coke oven for a period of time ranging from about 18 to about 24 hours.

15. The process of claim 8, wherein the steel/carbon product comprises from about 15 to about 45 percent by weight steel and from about 55 to about 85 percent by weight carbon.

16. A steel/carbon product produced by the process of claim 8, wherein the steel/carbon product consists essentially of steel substantially encapsulated in metallurgical coke.

\* \* \* \* \*